United States Patent [19]
Pilafidis et al.

[11] 3,752,968
[45] Aug. 14, 1973

[54] METHOD AND APPARATUS FOR PRODUCING SIGNALS REPRESENTING THE MOST SIGNIFICANT ECCENTRICITIES OF A PLURALITY OF SIMULTANEOUSLY ROTATING SPINDLES

[75] Inventors: Emile J. Pilafidis; Thiagarajan Viswanathan, both of Cincinnati, Ohio

[73] Assignee: Cincinnati Milacron Inc., Cincinnati, Ohio

[22] Filed: July 6, 1971

[21] Appl. No.: 159,826

[52] U.S. Cl............ 235/151.11, 318/571, 340/414, 235/151.3
[51] Int. Cl. ............................................ G06f 15/46
[58] Field of Search................. 235/151.11, 151.32, 235/189; 318/565, 636, 639, 571; 340/178-179, 412, 414, 220, 222; 82/48, 88, 45

[56] References Cited
UNITED STATES PATENTS

| 3,602,090 | 8/1971 | Whetham................ 235/151.11 UX |
| 3,158,849 | 11/1964 | Thaler........................... 340/414 XU |
| 3,634,664 | 1/1972 | Valek............................. 235/151.11 |
| 3,626,262 | 12/1971 | Kelling....................... 235/151.11 X |
| 3,612,841 | 10/1971 | Kosem et al................... 235/151.11 |
| 3,595,545 | 7/1971 | Sitnichenko et al....... 235/151.11 X |
| 3,609,321 | 9/1971 | Campbell, Jr.................. 318/636 X |

Primary Examiner—Malcolm A. Morrison
Assistant Examiner—Jerry Smith
Attorney—Howard T. Keiser et al.

[57] ABSTRACT

An apparatus and method for producing a signal representing the most significant eccentricities of a plurality of rotating spindles in a multiple spindle machine tool. The eccentricities of each spindle are monitored to produce a plurality of signals as a function of the eccentricities of the separate spindles. These signals are then compared with respect to one another. The most significant signal at any instant in time is then produced as an output signal representing the most significant eccentricity signal.

3 Claims, 8 Drawing Figures

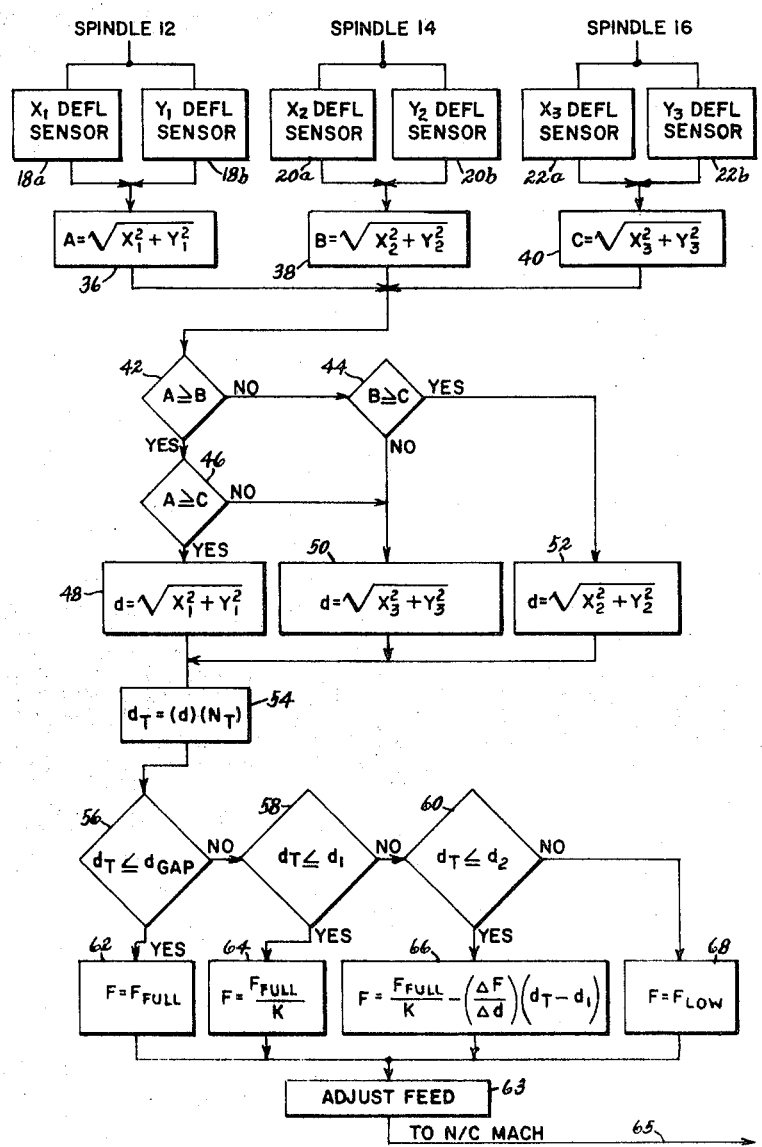

INVENTORS
EMILE J. PILAFIDIS
THIAGARAJAN VISWANATHAN
BY Howard S. Keiser
& Jack J. Earl
ATTORNEYS

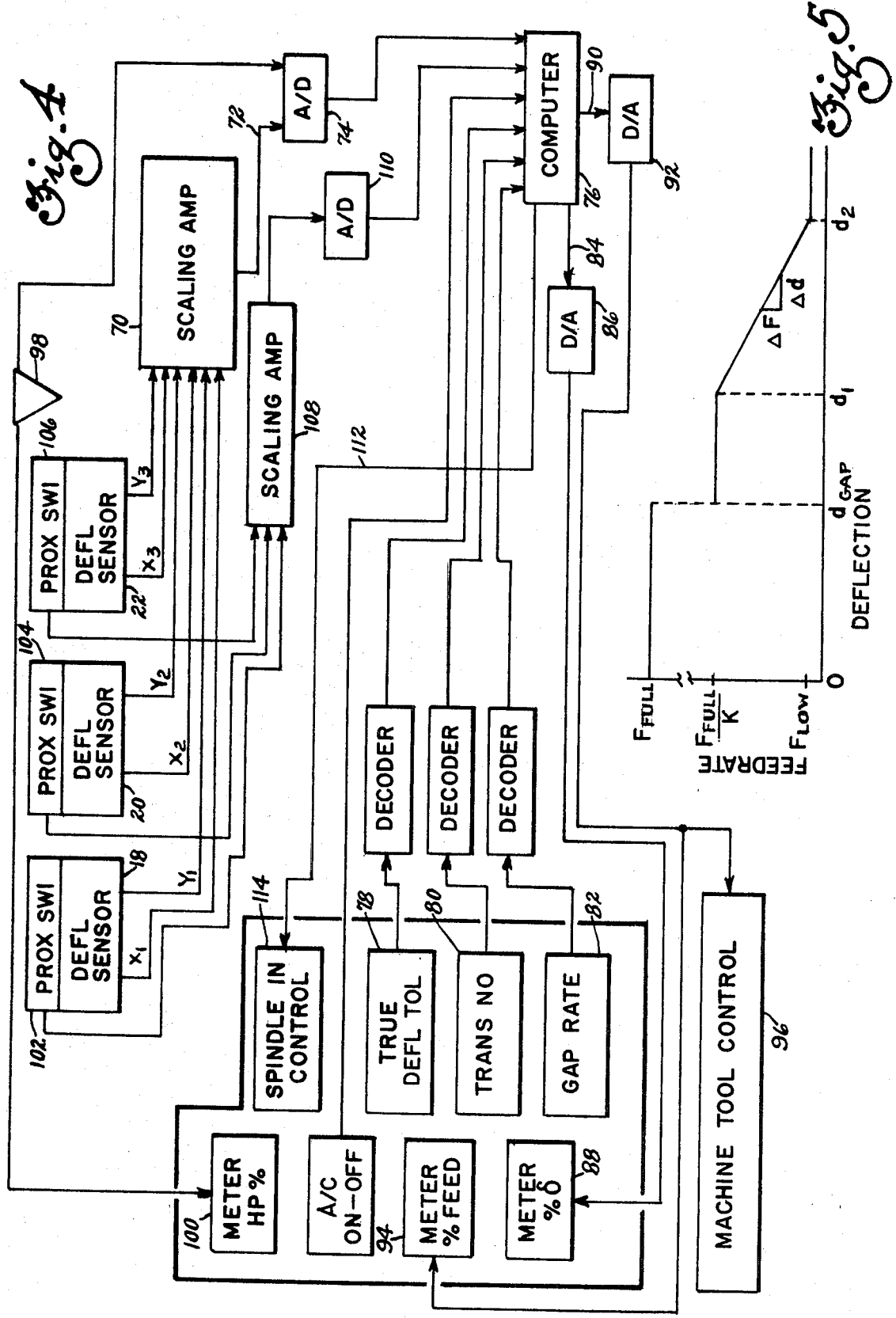

METHOD AND APPARATUS FOR PRODUCING SIGNALS REPRESENTING THE MOST SIGNIFICANT ECCENTRICITIES OF A PLURALITY OF SIMULTANEOUSLY ROTATING SPINDLES

BACKGROUND OF THE INVENTION

This invention relates generally to the problem of compensating for eccentricities during the rotation of a number of simultaneously operating spindles. Specifically, the invention discloses a method and apparatus for generating signals representing the most significant eccentricities detected during the simultaneous rotation of a plurality of spindles.

In the past, whenever a plurality of simultaneously rotating spindles have been utilized in conjunction with an adaptive control apparatus, only one of said spindles was monitored. This led to certain disadvantages particularly where an unmonitored spindle had a resultant error more critical and adverse to the machine tool process than the monitored spindle. Applicant proposes to solve this problem by disclosing a method and apparatus which allows the adaptive control system to simultaneously monitor all spindles in a multiple spindle machine tool.

SUMMARY OF THE INVENTION

The present invention discloses a method and apparatus for producing a composite signal representing a series of eccentricity signals produced by transducers and responsive to the most significant eccentricities at any particular time in a number of simultaneously rotating spindles.

This is achieved by providing a means for generating signals representing the eccentricities of each spindle through use of separate deflection sensors provided to monitor each spindle. The signals from each spindle are then compared with the corresponding signals from each of the other spindles. The most significant signals are then produced as an output. When accumulated over one cycle of rotation, the output signals represent the most significant eccentricity pattern for one revolution of the spindles. At any particular instant in time, the eccentricity signal is dependent upon the measurement at the spindle experiencing the most significant deflection. This signal can then be used in a variety of applications. For example, in a machine tool having a plurality of simultaneously operating spindles, the spindle feed can be controlled to depend upon the spindle which at any particular instant is generating the most significant eccentricity signal.

The advantages derived from such a system include the ability to produce a plurality of accurate workpieces on a multiple spindle machine tool with the most efficient production time being utilized.

THE DRAWINGS

FIG. 4 is an alternative embodiment of the present invention utilizing a computer to perform a portion of the routine of FIG. 3.

FIG. 5 is a curve representing the feed rate and deflection relationship of a typical constraint type adaptive control system.

DETAILED DESCRIPTION

Figure 1:
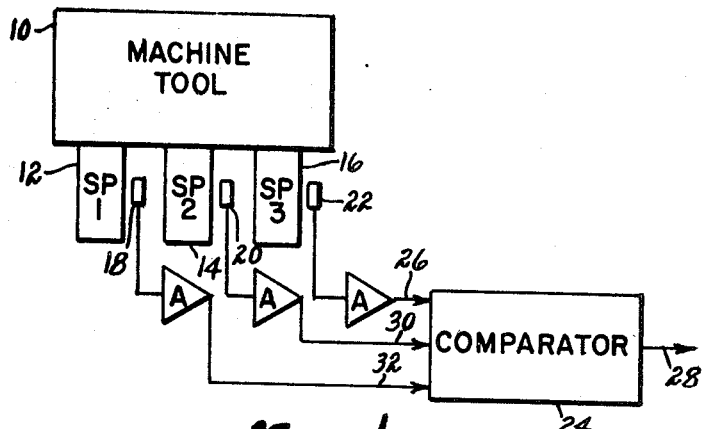
FIG. 1 is a flow chart of a multiple spindle machine tool embodying the present invention.

Referring at first to FIG. 1, the machine tool 10 has a number of simultaneously operating spindles 12, 14 and 16. As spindles 12, 14 and 16 rotate, the periodic eccentricities of each are detected by the sensing means 18, 20 and 22, respectively. Generally, the measurement is taken in both the X and the Y directions, where X and Y form a plane perpendicular to the spindle axis. The analogue signals thus generated are inputs to comparator 24. The comparator 24 determines the largest analogue signal. The output of the comparator 24 is an analogue signal representing the most significant deflection of the three spindles at any instant in time.

FIGS. 2a through d illustrate the deflection signals present at various points in the system of FIG. 1. The vertical axes represent the magnitude of the deflection signal, while the horizontal axes represent the position of a fixed point on the spindle as it rotates, or in the present case, where spindle RPM is constant, time. The marked cycle of each of the FIGS. 2a through d represent one complete revolution of the simultaneously operating spindles 12, 14 and 16.

Figure 2A:
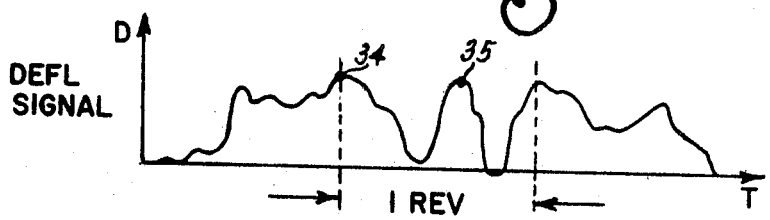
FIGS. 2a through 2d represent typical eccentricity patterns at various points in the system of FIG. 1.

FIG. 2a is the total deflection signal read by sensor 18 that is present at spindle 12 as it rotates. This signal is present on carrier 32 of FIG. 1. The eccentricities thus detected, as the spindle rotates a complete revolution, result generally from less than ideal operating conditions. As the feed rate of the spindle 12 with respect to a workpiece is increased during a machining process the corresponding deflection rate also increases.

Figure 2B:
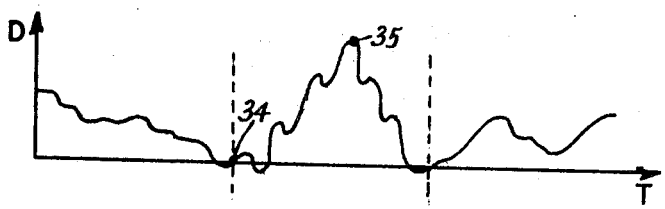
Figure 2C:
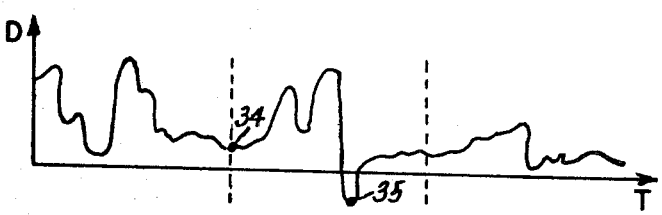

Since the spindles 12, 14 and 16 operate simultaneously, all progressing at the same feed rate and rotating at the same speed, the deflection signal will increase on each spindle simultaneously as the feed rate is varied. However, since the working conditions of each spindle are not identical, the deflection signal at any one instant (or at any particular point in rotation) is not necessarily the same for each spindle. This is illustrated in FIGS. 2a and b. FIG. 2b represents the deflection signal present at spindle 14 as detected by sensor 20 for the same rotation period as the signal is present on line 30 in FIG. 1. FIG. 2c represents in a similar manner the signal read at spindle 16 and present on line 26 of FIG. 1.

Figure 2D:
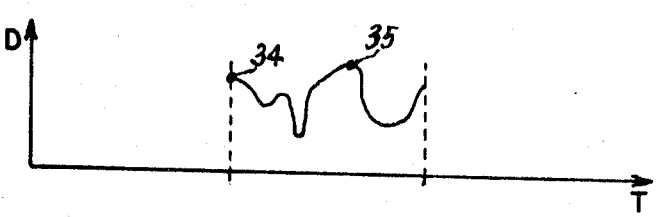

Each of these signals is an input to the comparator 24. The function of the comparator 24 is to generate signal that represents the most significant deflection signal present at any of the spindles 12, 14 and 16 at any point during rotation of the spindles. The signal produced by the comparator is illustrated in FIG. 2d which is a composite signal made up of the largest deflection signals as depicted in FIGS. 2a through 2c. This output signal is carried on line 28. For example, looking at the starting point 34 of one complete revolution it can be seen that the deflection at spindle 12 (depicted in FIG. 2a) is greater than the error present at spindle 14 or spindle 16. Thus, the output signal of the comparator 24 at this point (see FIG. 2d) is identical to the deflection signal present at spindle 12. To further illustrate, looking at point 35 on FIGS. 2a through c it can be seen as the largest signal is present at spindle 14

(FIG. 2b). The output of the comparator 24 at this point is, therefore, the deflection detected at spindle 14. The comparator 24 thus generates composite analogue deflection signal representing the most significant eccentricities present at any of the spindles at any particular instant during simultaneous rotation of the spindles.

It should be mentioned here that in cases where less than all the available spindles are utilized, the control system still functions in the prescribed manner. For example, if only spindles 14 and 16 are used, spindle 12 being idle, there would be no deflection detected by sensor 18. The composite signal illustrated in FIG. 2d would then consist only of components from sensors 20 and 22. The apparatus herein described can be utilized with machine tool having any number spindles used in any combination.

Figure 3:
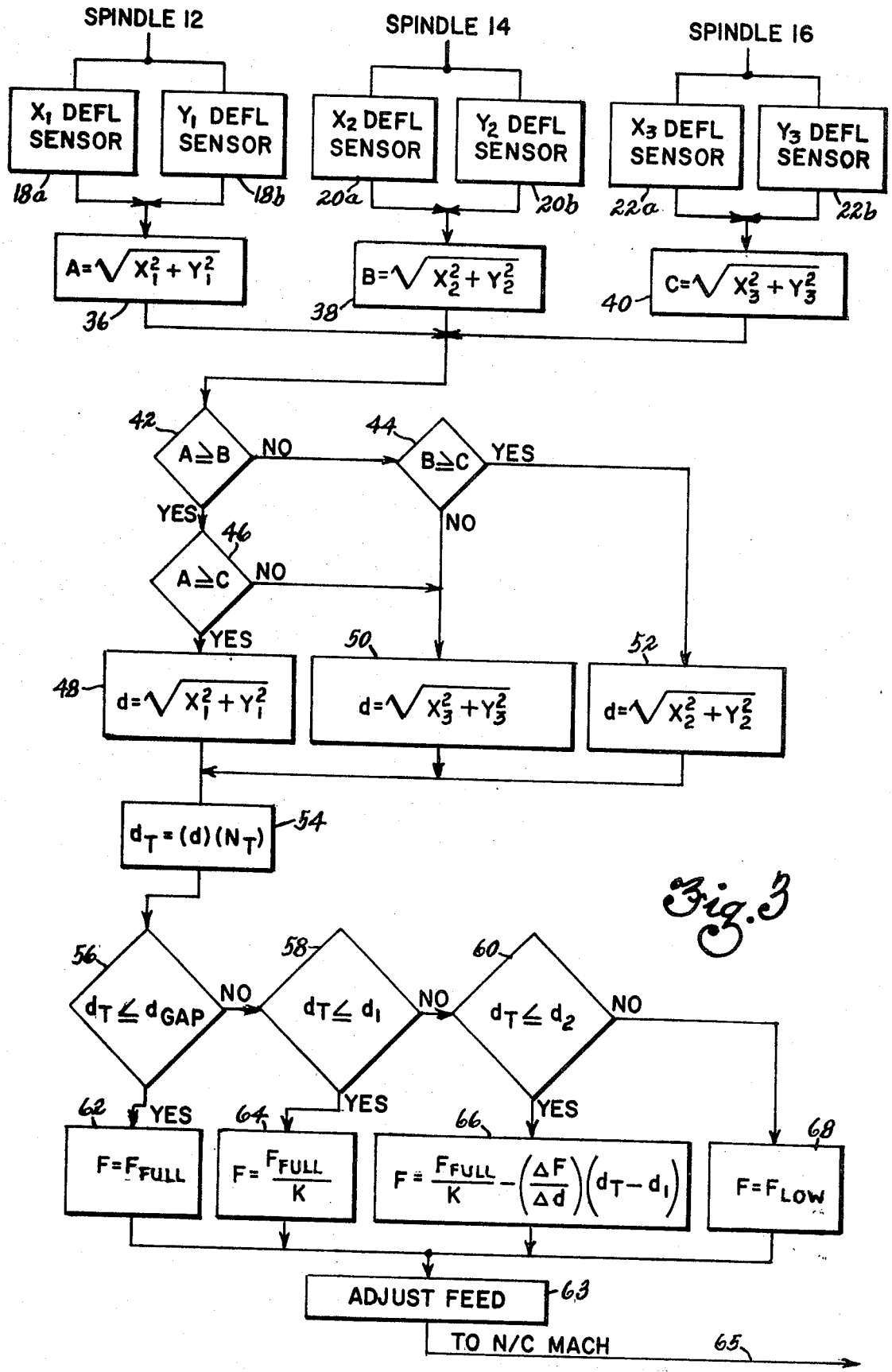
FIG. 3 is a flow diagram illustrating the functions of the various components of the preferred embodiment.

FIG. 3 is a signal flow diagram illustrating the various steps performed by the present invention described and depicted in FIGS. 1 and 2. Generally deflection sensors are provided for two orthogonal directions. This allows a vector representing the actual deflection in the plane of the orthogonal direction vectors to be computed from the components thus measured. The deflection plane is generally perpendicular to the normal, or corrected axis of the spindle.

The sensors 18a and 18b represent sensor 18 of FIG. 1. Sensors 20a and 20b and sensors 22a and 22b represent sensors 20 and 22 of FIG. 1 in a similar fashion. The deflection component detected by sensor 18a is combined with its orthogonal component detected by sensor 18b at a function block 36. This is achieved by squaring and adding both components and extracting the positive square route thereof. The symbol A represents the absolute value of the magnitude of a vector representing the deflection signal present at spindle 12 at any instant in time. The symbols B and C are determined at function blocks 38 and 40 and represent in a similar fashion the deflection signals present at spindles 14 and 16, respectively. It should be understood that only the absolute value of the magnitude of the deflection signal is necessary for the purpose herein described. If desirable the phase could be retained, for example, by storing the polarity of each component at this point.

The decision matrix consisting of decision blocks 42, 44 and 46 performs the functions of comparator 24 in FIG. 1. It simply determines which of the signals A, B, C is largest at any instant in time. When at least two of the signals are equal, neither is determinative and therefore either can control. To prevent the system malfunction in that regard, the first of any two equal signals is always picked. Any alternative method of avoiding this dilemma would suffice.

Assuming that A represents the largest deflection vector, it can be seen that the output of the decision matrix would flow into the function block 48. Spindle 12 is said to then be in control, for it is experiencing the most significant deflection at that instant. The symbol $d$ represents the actual measured deflection at the controlling spindle. In this case since A is the largest deflection vector, spindle 12 is the controlling spindle and $d = \sqrt{X_1^2 + Y_1^2} = A$. If B or C were the largest, $d = \sqrt{X_2^2 + Y_2^2}$ or $d = \sqrt{X_3^2 + Y_3^2}$, respectively, as defined by function block 50 and 52. $d$, therefore, represents the largest measured deflection signal at any particular instance.

Generally, it is not possible to measure deflection at the point where the rotating tools are in contact with the workpiece. However, this is the critical measurement necessary to control the accuracy and efficiency of a machine tool process. In the present case, the actual deflection of the tool at the time in contact with the workpiece can be determined experimentally. The difference between this deflection and the measured deflection of the spindle holding the tool will vary, of course, with physical characteristics of the tool. Once this factor is determined, the true deflections can be calculated from the error signal. when the sensor is mounted to measure the deflection at the spindle as in the present case, the tool held in the spindle will generally be deflected to a greater degree than the spindle. The difference in deflection, as calculated from experimentation, is represented by a transfer number, $N_T$. In a multiple spindle operation, only one transfer number is needed for a particular operation. $N_T$ may be changed slightly, however with the number of spindles in use. Thus, the operator must input the proper $N_T$ for the number of spindles used in a particular operation.

Function block 54 is a multiplier that combines the predetermined transfer number, $N_T$, with the most significant measured deflection, $d$, to produce true deflection, $d_T$. The output signal, $d_T$, of function block 54 is the true deflection of a rotating tool from its ideal axis at the point where the tool tip is in contact with a workpiece. In the case of a multiple spindle machine tool as herein described, $d_T$ is the most significant true deflection. At this point, the deflection signal could be used in a variety of ways.

For example, it could be stored to provide a permanent record of the deflection pattern.

Another use is illustrated in FIG. 3. The deflection signal is compared with predetermined tolerance limits. Based upon these comparisons, the feed rate of the tool into the workpiece is adjusted to keep the deflection within certain bounds. This is achieved through use of a decision matrix consisting of decision blocks 56, 58 and 60.

In decision block 56, $d_{gap}$ represents the inherent eccentricity of the rotating tool. This is the deflection present when the tool is rotating in air, i.e., before the tool engages the workpiece. Therefore, decision block 56 determines whether the true deflection is as great as the gap deflection, $d_{gap}$. If $d_T$ is less than or equal to $d_{gap}$ the machining process can continue to progress at maximum feed rate.

This is controlled by function block 62 which initiates an adjust feed signal 63 representing full feed rate to a machine tool control via transmission line 65.

In the case $d_T$ is greater than $d_{gap}$, two things can happen. This is best understood by referring to FIG. 5 which is the curve illustrating the feed rate — deflection relationship of a typical constraint type adaptive control system. As illustrated, the vertical axis represents feed rate of the tool with respect to the workpiece and the horizontal axis represents the deflection signal present at the controlling spindle. As can be seen in FIG. 5 the feed rate is reduced by a predetermined constant, K, as soon as the deflection signal reaches the $d_{gap}$ threshold. K is determined by such factors as machine dynamics, characteristics of the tool, and desired accuracy of the finished workpiece. During the period the deflection signal is greater than $d_{gap}$ the adaptive control system as described herein conforms to a constraint system. This means that once the fixed feed range is passed, the machine tool process passes into a region of constraint. In the present case, the constraint threshold is reached when the deflection signal becomes greater than $d_1$.

The fixed feed range is reflected in the output of decision block 58. For the period when the deflection signal is greater $d_{gap}$ but less than $d_1$, the feed rate, F, is at the maximum in metal rate, here $F_{full}/K$ as defined in function block 64. The upper limit of the fixed feed range, $d_1$ is a percentage of the deflection limit, $d_2$, that will permit the part produced to be within the required tolerances. Generally, $d_1$ is approximately 0.8 $d_2$.

When $d_T$ is greater than $d_1$, the adaptive control system enters the region of constraint. In this region the feed rate varies inversely with the deflection signal. In the system illustrated in FIGS. 3 and 5 it can be seen that the controlling equation for the feed rate is:

$$F = (F_{full}/K) - (\Delta F/\Delta d)(d_T - d_1)$$

where F is the feed rate; and $\Delta F/\Delta d$ is the slope of the constraint curve, and is at least partially dependent upon the machine dynamics, tool characteristics, and required accuracy. When the deflection signal, $d_T$, is in the range between $d_1$ and $d_2$, the feed rate is defined by function block 66. Where the deflection signal exceeds $d_2$, the feed rate is adjusted to $F_{low}$ through function block 68. Function blocks 66 and 68 are activated by the decision block 60 which determines when the deflection is within or beyond the constraint region. As can be seen in FIG. 5, the full range of the feed rate, F, in the constraint region is from $F_{full}/K$ to $F_{low}$.

To achieve optimum production rate it is desirable to keep the deflection error as near to $d_1$ as practicable. When $d_T$ is closer to $d_{gap}$ than $d_1$, the maximum feed rate, $F_{full}$, can be adjusted by the operator to bring the machining process to the threshold of the constraint region. From here the control system will take over. Thus the machine tool can function at a near optimum rate for any particular operation.

FIG. 4 illustrates an alternative embodiment of the present invention. The deflection sensors 18, 20 and 22 are connected and operate in the same manner as previously described to produce analogue deflection component signals for each of three spindles. The scaling amplifier 70 prepares these signals for analogue to digital conversion. It should be understood a digital computer performing the calculations illustrated in function blocks 36 through 63 of FIG. 3 requires a digital input from each of the deflection sensors 18a through 22b. The analogue to digital convertors 72 and 110 provide this function in the embodiment illustrated in FIG. 4. If an analogue computer, or hard wired components were utilized to perform the calculations described in FIG. 3 the conversion circuits would no longer be necessary. Amplifier 70, for example, could consist of amplitude scaler in conjunction with a typical multiplexer unit that transmits six input signals over a single transmission line 72. The deflection signals are then converted to their digital equivalents through analogue to digital convertor 74. A digital computer 76 then performs the basic function of the comparator 24 and an adaptive control mechanism.

The true deflection tolerance limits 78 ($d_1$ and $d_2$), the transfer number 80 ($N_T$) and the gap deflection rate 82 ($d_{gap}$) are also inputs to the computer 76. The output of the computer 76 which is present on transmission line 84 thus consists of a digital signal representing the most significant true deflection signal of the controlling spindle at any particular instant in time. This signal is changed to an analogue signal by digital to analogue convertor 86 and is displayed as a percent of the total allowable deflection at deflection display meter 88. The output of computer 76 present on carrier 90 is the digital signal representing the corrected feed rate of the spindle due to the measured deflection. The corrected feed rate signal is converted to an equivalent analogue signal by digital to analogue convertor 92 and is displayed as a precent of the maximum feed rate at feed rate display meter 94. This feed rate signal is also supplied to machine tool control 96 and adjusts the operating feed rate of the spindles to conform to the corrected feed rate signal.

The system depicted in FIG. 4 has two added features used in conjunction with the present invention. Horsepower sensor 98 detects the horsepower consumption of a motor turning the spindles during a machining operation. This signal operates as a safety override and will reduce the adjusted feed rate at the computer 76 should the horsepower consumption of the spindle motor ever exceed its rated value, or a predetermined percent of its rated value. The horsepower consumption of the spindle motor is also displayed as a percent of rated horsepower at meter display 100. The horsepower sensing means provides an input to the computer 76 to further adjust the feed rate in a constraint manner. That is, the curve in FIG. 5 is identical to the curve controlling the feed rate adjustment due to horsepower consumption. In a feed rate — horsepower consumption curve the horizontal axis would be horsepower consumption wherein $d_{gap}$ would be replaced by horsepower at the gap and $d_1$ and $d_2$ would be replaced by predetermined horsepower consumption limits. Therefore, when the horsepower consumption reaches the constraint threshold, the feed rate is controlled in the same manner as it is in the previously described deflection controlled mechanism. When used in conjunction with the deflection sensors, the horsepower constraint system is secondary and is initiated only when the horsepower consumption is above predetermined safe limits.

A second added feature of the described embodiment is the automatic balancing mechanism. This mechanism is more fully described in the co-pending application of R. A. Mathias and E. J. Watson, entitled: "A Method and Apparatus for Automatically Balancing Deflection Sensors on Rotating Equipment," U.S. Pat. Ser. No. 118,063 and assigned to the present assignee. Basically, the automatic balancing means is utilized to measure inherent deflections that are common to the machine, such as irregularities like thermal drift and mechanical shiftings of the spindle. These are monitored, digitized and stored in the computer via a small ring mounted on the spindle, a proximity switch, and the deflection sensor. The inherent deflections are then automatically compensated for during cutting. In a multiple spindle machine tool system as herein described, it is desirable to have a separate balancing mechanism for each spindle. The inherent deflections are monitored by proximity switches 102, 104 and 106 while the spindles are rotating in air, i.e., before the tool engaged the workpiece. The inherent deflections are then input to a scaling amplifier 108 similar to amplifier 70 and converted to equivilant digital signals by convertor 110. The digital signals representing the inherent deflection in each spindle are then stored in computer 76. Whenever a deflection is read by any of sensors 18, 20 and 22, while their respective tools are engaged in workpieces the measured deflection errors are compared with and compensated by the respective inherent deflection signals. Thus, the deflection signal in this case is the measured deflection as corrected by the inherent deflection for a particular spindle. These are the deflection signals present at each spindle which are compared to determine which spindle has the most significant deflection signal at any particular instant.

The spindle experiencing the most significant deflection at any particular instant is said to be the spindle in control. The output present on carrier 112 from computer 76 carries a signal representing the controlling spindle. This signal is displayed at spindle display 14.

It should be understood that the foregoing is for illustrative purposes only and is not intended to limit the spirit of the invention or the scope of the appended claims.

What is claimed is:

1. In a machine tool having a plurality of simultaneously rotating spindles, with tools secured therein for engagement with workpieces to perform an operation thereon at a predetermined feed rate, an apparatus for generating a signal representing the most significant eccentricities of said rotating spindles and for producing an output dependent thereon to adjust said feed rate, said apparatus comprising:
   a. a sensing means responsive to each of said rotating spindles for producing a plurality of analogue signals as a function of the eccentricities of each of said spindles;
   b. comparing means for receiving said plurality of analogue signals and producing an output that is representative of the most significant of said plurality of analogue signals at any instant in time; and
   c. an adaptive control mechanism which receives the output of said comparing means and produces an output signal dependent thereon to alter said predetermined feed rate.

2. A method for providing an input to an adaptive control mechanism to regulate the feed rate of a rotating tool relative to a workpiece, said input being responsive to the eccentricities of each spindle on the machine tool having a plurality of simultaneously operating spindles, the method comprising the steps of:
   a. producing electric signals representing the eccentricities present at each of said spindles;
   b. selecting from said electric signals the most significant electric signal at any instant in time;
   c. producing an output signal representing the most significant electric signal; and
   d. producing in an adaptive control system a feed rate regulating signal responsive to said output signal to maintain the feed rate of the tool relative to the workpiece within predetermined limits.

3. A method fo regulating the feed rate of rotating tool relative to a workpiece in a machine tool with a plurality of simultaneously operating spindles for holding the tools, said method comprising the steps of:
   a. producing a first deflection component signal for each of said spindles, each signal being responsive to the deflection of one of said spindles in a predetermined direction;
   b. producing a second deflection component signal of each of said spindles, each signal being responsive to the deflection of one of said spindles in a direction perpendicular to the predetermined direction;
   c. squaring said first and second deflection component signals of each spindle;
   d. summing the first and second squared component signals of each spindle;
   e. extracting the square root of each sum to determine a deflection vector signal;
   f. comparing the deflection vector signal of each spindle to determine the most significant deflection vector signal at any instant in time; and
   g. producing a feed rate signal responsive to said most significant deflection vector signal.

* * * * *